United States Patent Office.

MOSHER A. SUTHERLAND, OF NEW YORK, N. Y.

Letters Patent No. 95,162, dated September 21, 1869.

---

IMPROVED RUBBER COMPOUND.

---

The Schedule referred to in these Letters Patent and making part of the same.

---

*To all whom it may concern:*

Be it known that I, MOSHER A. SUTHERLAND, of the city, county, and State of New York, have invented a new and improved Rubber Compound; and I do hereby declare that the following is a full, clear, and exact description of the same.

This invention consists in a new "rubber compound," so called, which is composed of India rubber, or caoutchouc, and asbestos, with a quantity of sulphur sufficient to effect a proper vulcanization of the mass.

To produce a compound of sufficient hardness to answer for a great variety of purposes, I find that the following proportions of the above-named ingredients will answer, to wit:

Crude rubber or caoutchouc, say, eight pounds.
Asbestos, say, eight pounds.
Sulphur, say, one pound.

The mixing together of the ingredients may be accomplished in any suitable manner; for instance, in the way usually practised in this art, that is to say, the pulverized or disintegrated asbestos is mixed with the rubber by running both together through heated rollers. Then the sulphur may be mixed with this compound in the same way.

After the ingredients have been properly incorporated, I put the compound into moulds of the requisite shape, and effect the vulcanization of the compound in one of the modes at present practised. I prefer to place the moulds in a steam-heater, and vulcanize with steam of say about eighty pounds pressure.

Asbestos, it is well known, is of a fibrous nature, and, when properly disintegrated, it has a tendency to hold the mass together. It is, moreover, a very poor conductor of heat, and, therefore, my compound is well adapted for use when it is to be subjected to heat. For instance, it provides a good steam-packing.

As before stated, the proportions of the ingredients used may be considerably varied. For instance, I can take asbestos, eight pounds; rubber, four pounds; sulphur, half a pound, and incorporate them, and vulcanize, and I obtain a harder compound.

I do not, therefore, limit myself to any particular proportions of the several ingredients, nor to the manner of mixing them together; nor to the pressure of steam or degree of heat used for vulcanizing the compound.

In proportion as the asbestos is used in regard to the rubber, the compound increases or decreases in hardness.

What I claim as my invention, and desire to secure by Letters Patent, is—

A compound, composed of the ingredients, in the proportions and prepared in substantially the manner herein set forth.

Witnesses:    MOSHER A. SUTHERLAND.
  M. M. LIVINGSTON,
  T. B. BEECHER.